(12) United States Patent
Irisawa

(10) Patent No.: US 8,483,900 B2
(45) Date of Patent: Jul. 9, 2013

(54) HYBRID VEHICLE

(75) Inventor: Yasuyuki Irisawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 34 days.

(21) Appl. No.: 13/361,008

(22) Filed: Jan. 30, 2012

(65) Prior Publication Data

US 2012/0197471 A1 Aug. 2, 2012

(30) Foreign Application Priority Data

Feb. 2, 2011 (JP) ................................ 2011-021063

(51) Int. Cl.
*F02D 41/00* (2006.01)

(52) U.S. Cl.
USPC ............................................ 701/22; 123/673

(58) Field of Classification Search
USPC .... 701/22, 103, 104, 106; 123/673; 180/65.1, 180/65.21, 69.4, 69.5, 335; 903/905
See application file for complete search history.

(56) References Cited

U.S. PATENT DOCUMENTS

| | | | | |
|---|---|---|---|---|
| 5,126,943 A | * | 6/1992 | Nakaniwa | 701/106 |
| 5,131,372 A | * | 7/1992 | Nakaniwa | 123/673 |
| 2005/0072410 A1 | * | 4/2005 | Ohsaki | 123/674 |
| 2008/0277176 A1 | * | 11/2008 | Akimoto | 180/65.4 |
| 2010/0036589 A1 | * | 2/2010 | Ando | 701/105 |
| 2010/0192929 A1 | * | 8/2010 | Ishiwatari | 123/674 |

FOREIGN PATENT DOCUMENTS

| | | |
|---|---|---|
| JP | 2005030237 A | 2/2005 |
| JP | 2006-266240 A | 10/2006 |
| JP | 2009-030455 A | 2/2009 |

\* cited by examiner

*Primary Examiner* — Mary Cheung
(74) *Attorney, Agent, or Firm* — Gifford, Krass, Sprinkle, Anderson & Citkowski, P.C.

(57) ABSTRACT

A hybrid vehicle includes: a multi-cylinder internal combustion engine and an electric motor, a power source control unit that controls the engine and the motor, an air-fuel ratio control unit that controls the air-fuel ratio of exhaust gas of the engine to obtain a target air-fuel ratio, a battery that stores electric power that is supplied to the motor, a state-of-charge detection unit that detects a state-of-charge of the battery, a detection unit that detects an air-fuel ratio imbalance abnormality of the internal combustion engine and identifies an abnormal cylinder that has caused the imbalance abnormality, and a correction unit that corrects, in a case where the air-fuel ratio imbalance abnormality has been detected, a fuel injection amount of the abnormal cylinder based on a battery state-of-charge decrease amount from when the abnormality is detected to the time when a predetermined time interval is elapsed after the detection.

7 Claims, 14 Drawing Sheets

F I G . 6
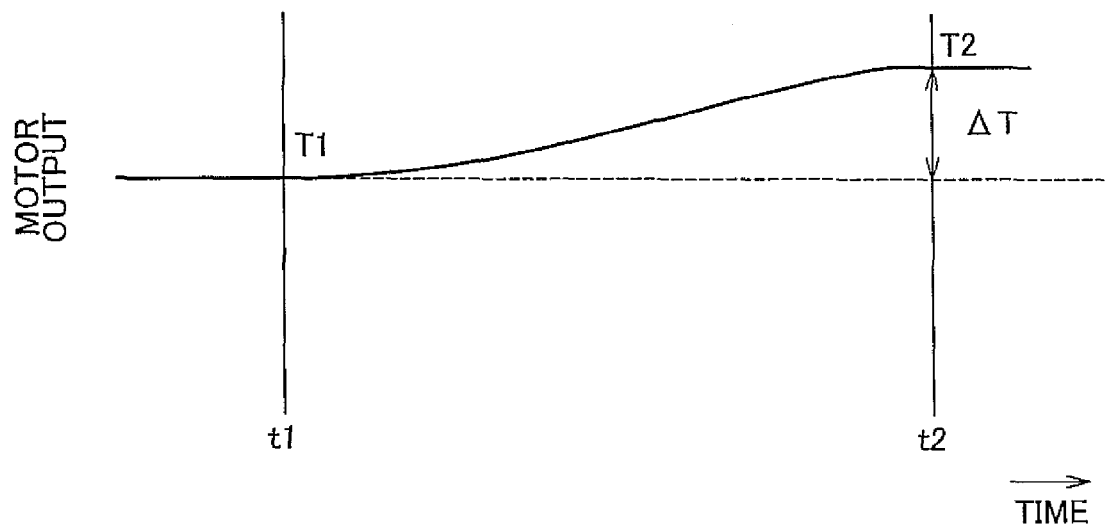

//HYBRID VEHICLE

CROSS REFERENCE TO RELATED APPLICATIONS

This application claims priority to Japanese Patent Application No. 2011-021063 filed on Feb. 2, 2011, which is incorporated herein by reference in its entirety including the specification, drawings and abstract.

BACKGROUND OF THE INVENTION

1. Field of the Invention

The invention relates to a hybrid vehicle, and more particularly to a hybrid vehicle provided with power source of two types, namely, an internal combustion engine (engine) and an electric motor (motor), as power sources for running a vehicle.

2. Description of Related Art

A demand has grown in recent years for on-board detection of air-fuel ratio imbalance abnormalities between cylinders in a vehicle having a multi-cylinder internal combustion engine installed therein (which is on-board diagnostics (OBD), and a movement to regulate such detection by laws has recently been observed. For example, where a fuel injection system of some cylinders fails, a large imbalance of air-fuel ratio occurs between the cylinders and exhaust emission of the vehicle is degraded. The abovementioned demand has been created to prevent such a vehicle from running.

The same demand also applies to hybrid vehicles having a multi-cylinder internal combustion engine installed therein. When an air-fuel ratio imbalance abnormality is detected, it is desirable that fuel injection amount be corrected to eliminate the state of abnormality in order to prevent subsequent degradation of emission.

A comprehensive research conducted by the inventors demonstrated that when an air-fuel ratio imbalance abnormality occurs in an internal combustion engine in a hybrid engine, this abnormality also affects the drive system of the electric motor.

SUMMARY OF THE INVENTION

The invention provides a hybrid vehicle in which fuel injection amount can be advantageously corrected when an air-fuel ratio imbalance abnormality is detected.

A hybrid vehicle according to the first aspect of the invention includes: a multi-cylinder internal combustion engine as a first power source for running the vehicle; an electric motor as a second power source for running the vehicle; a power source control unit that controls the internal combustion engine and the electric motor so as to obtain predetermined target outputs from both the internal combustion engine and the electric motor; an air-fuel ratio control unit that feedback controls an air-fuel ratio of exhaust gas of the internal combustion engine so as to obtain a target air-fuel ratio; a battery that stores electric power that is supplied to the electric motor; a state-of-charge detection unit that detects a state-of-charge of the battery; a detection unit that detects an air-fuel ratio imbalance abnormality of the internal combustion engine and identifies an abnormal cylinder that has caused the air-fuel ratio imbalance abnormality; and a correction unit that corrects a fuel injection amount of the abnormal cylinder based on a battery state-of-charge decrease amount from when the air-fuel ratio imbalance abnormality has been detected to when a predetermined time interval has elapsed after detection of the air-fuel ratio imbalance abnormality.

A hybrid vehicle according to the first aspect of the invention includes: a multi-cylinder internal combustion engine as a first power source for running the vehicle; an electric motor as a second power source for running the vehicle; a power source control unit that controls the internal combustion engine and the electric motor so as to obtain predetermined target outputs from both the internal combustion engine and the electric motor; an air-fuel ratio control unit that feedback controls an air-fuel ratio of exhaust gas of the internal combustion engine so as to obtain a target air-fuel ratio; a battery that stores electric power that is supplied to the electric motor; a state-of-charge detection unit that detects a state-of-charge of the battery; a detection unit that detects an air-fuel ratio imbalance abnormality of the internal combustion engine and identifies an abnormal cylinder that has caused the air-fuel ratio imbalance abnormality; and a correction unit that corrects a fuel injection amount of the abnormal cylinder based on a difference in output of the electric motor between when the air-fuel ratio imbalance abnormality has been detected and when a predetermined time interval has elapsed after detection of the air-fuel ratio imbalance abnormality.

According to the abovementioned aspects of the invention, it is possible to provide a hybrid vehicle in which fuel injection amount can be advantageously corrected when an air-fuel ratio imbalance abnormality is detected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a time chart illustrating the increase in motor output when an imbalance abnormality has occurred;

DETAILED DESCRIPTION OF EMBODIMENTS

An embodiment of the invention will be explained below with reference to the appended drawings.

Figure 1:
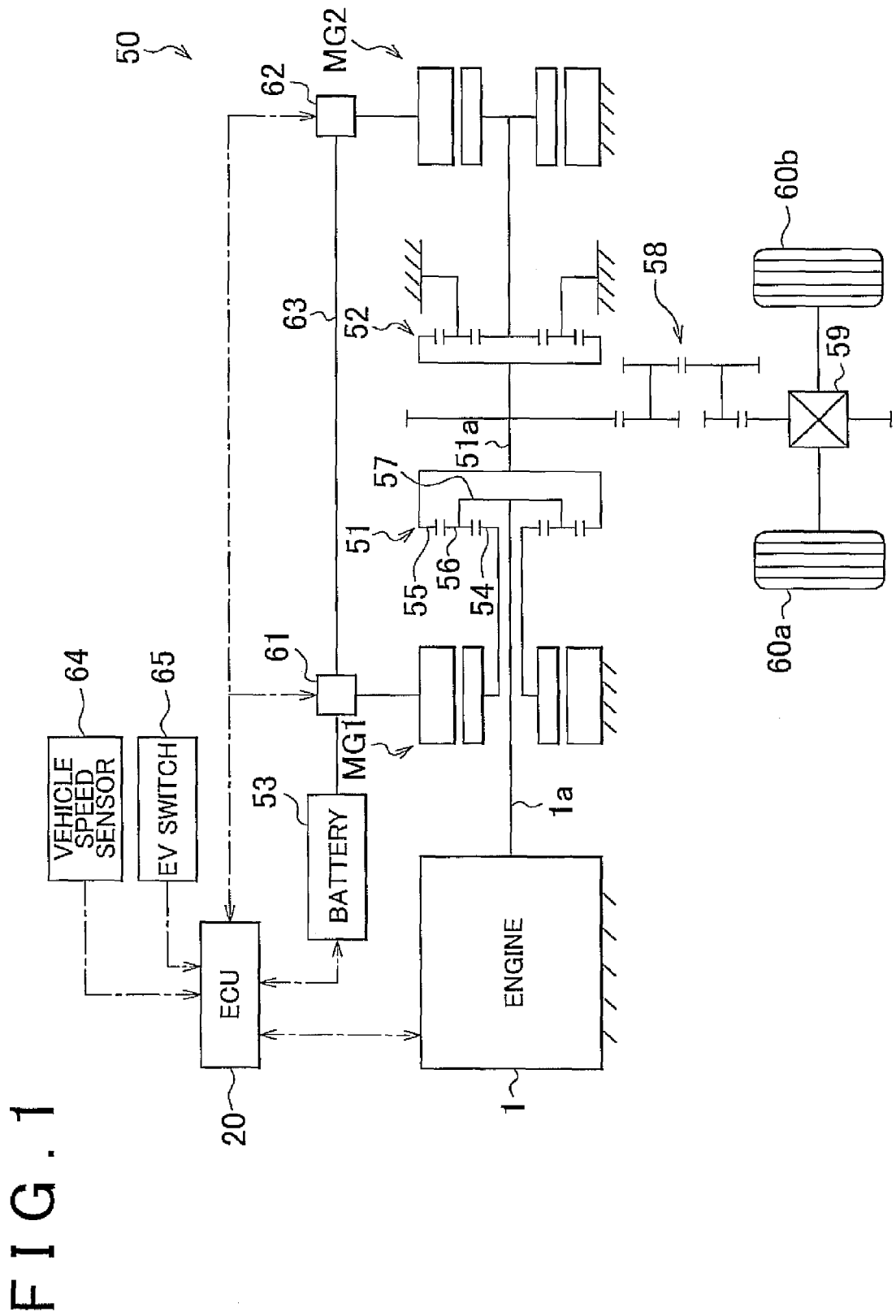
FIG. 1 is a schematic diagram of the hybrid vehicle of the embodiment of the invention.

FIG. 1 is a schematic diagram of a hybrid vehicle 50 of the embodiment. The hybrid vehicle 50 is provided with an internal combustion engine (engine) 1, a power distribution mechanism 51 of a three-shaft power split mechanism that is connected to a crankshaft 1a serving as an output shaft of the engine 1, a first electric motor, that is, a first motor generator (referred to hereinafter as the first motor) MG1 that is connected to the power distribution mechanism 51 and may generate power, a reduction gear mechanism 52 connected to a ring gear shaft 51a that is an output shaft to the power distribution mechanism 51, a second electric motor, that is, a second motor generator (referred to hereinbelow simply as the second motor) MG2 that is connected to the reduction gear mechanism 52 and may generate power, and an electronic control unit (referred to hereinbelow as ECU) as a control unit that controls the entire vehicle.

The engine 1 serve as a first power source for running, and the first motor MG1 constitutes a second power source for running. Electric power supplied to the first motor MG1 is stored in a battery 53. The second motor MG2 functions mainly as a power generator for charging the battery 53.

The ECU 20 may be constituted by an engine ECU that controls the engine 1, a motor ECU that controls the motors MG1 and MG2, and a battery ECU that manages the battery 53.

The engine 1 generates power by combustion of fuel such as gasoline or light oil and is constituted, for example, by a multi-cylinder spark-ignition internal combustion engine such as described below.

The power distribution mechanism 51 is constituted by a planetary gear mechanism and includes a sun gear 54 disposed in the center, a ring gear 55 disposed on the outer circumferential side, a plurality of pinion gears 56 disposed between the sun gear 54 and ring gear 55, and a carrier 57 that holds the pinion gears 56 so that the pinion gears may rotate and revolve.

The crankshaft 1a of the engine 1 is connected to the carrier 57, the first motor MG1 is connected to the sun gear 54, and the reduction gear mechanism 52 is connected by the ring gear shaft 51a to the ring gear 55.

When the first motor MG1 functions as a power generator, the power from the engine 1 that is inputted from the carrier 57 is distributed according to the gear ratio to the sun gear 54 side and ring gear 55 side.

When the first motor MG1 functions as an electric motor, the power from the engine 1 that is inputted from the carrier 57 and the power from the first motor MG1 that is inputted from the sun gear 54 are combined and output to the ring gear 55 side. The power output to the ring gear 55 from the ring gear shaft 51a is eventually transmitted to drive wheels 60a, 60b of the vehicle through a gear mechanism 58 and a differential gear 59.

The first motor MG1 and the second motor MG2 are configured as conventional synchronous generator motors having the functions of both a generator and a motor and exchange power with the battery 53 via a first inverter 61 and a second inverter 62, respectively.

A power line 63 connecting the inverters 61, 62 to the battery 53 has a positive polarity base line and a negative polarity base line shared by the inverters 61, 62, and the power generated by either of the motors MG1, MG2 may be consumed by the other motor. Therefore, the battery 53 is charged by the power generated by either of the motors MG1, MG2 and discharged by the lack of power therefrom. Where the power balance is attained by the motors MG1, MG2, the battery 53 is neither charged nor discharged.

The ECU 20 inputs signals necessary for controlling the motors MG1, MG2, for example a signal from a revolution position detection sensor (not shown in the figure) that detects a revolution positions of the rotors of the motors MG1, MG2 and a signal from a current sensor (not shown in the figure) that detects a phase current applied to the motors MG1, MG2. The ECU 20 calculates the revolution speed of the motors MG1, MG2 based on the signal from the revolution position detection sensor. The ECU 20 outputs a switching control signal to the inverters 61, 62.

The ECU 20 inputs signals necessary for managing the battery 53, for example, a voltage signal from a voltage sensor (not shown in the figure) disposed between positive and negative terminals of the battery 53, a charge-discharge current signal from a current sensor (not shown in the figure) mounted on the power line 63, and a battery temperature sensor from a temperature sensor (not shown in the figure) mounted on the battery 53.

The ECU 20 calculates a state of charge SOC of the battery 53 based on the integral value of charge-discharge current detected by the current sensor and calculates an input/output restriction, which is the maximum allowed power by which the battery 53 may be charged and discharged, based on the state of charge SOC and battery temperature.

When the state of charge SOC is calculated, the ECU 20 integrates the charge-discharge current of the battery 53 detected by the current sensor. In this case, the charge current is taken as a positive value and the discharge current is taken as a negative value, and charge-discharge current integral value is added to the state of charge SOC. The state of charge SOC may be also calculated by other methods. Thus, the ECU 20 functions as a state-of-charge detection unit that detects the battery state-of-charge.

The ECU 20 is constituted by a central processing unit (CPU), a read-only memory (ROM), a random access memory (RAM), an input/output port (none is shown in the figure) and the like. The ECU 20 inputs via the input port an ON/OFF signal from an ignition switch (not shown in the figure), a shift position signal from a shift position sensor (not shown in the figure) that detects an operation position of a shift lever, an accelerator depression amount signal from an accelerator depression amount sensor (see FIG. 2) 15 that detects an accelerator pedal operation amount, a brake position signal from a brake position sensor (not shown in the figure) that detects a brake pedal operation amount, a vehicle speed signal from a vehicle speed sensor 64, an ON/OFF signal from an EV switch 65 serving as a motor mode switch that indicates that the vehicle is driven only by the motor, and an ON/OFF signal from an eco switch (not shown in the figure) that indicates that fuel efficiency of the vehicle is a priority.

The ECU 20 calculates a target output (or a target torque) that should be output to the ring gear shaft 51a serving as a drive shaft based on the vehicle speed and accelerator depression amount corresponding to the accelerator pedal operation amount inputted by the driver, and controls the engine 1 and the first motor MG1 so that the output equal to the target output is actually obtained from the ring gear shaft 51a. In this case, the ECU 20 determines the target engine output and target motor output for the engine 1 and the first motor MG1 based on operation conditions of the engine and vehicle and controls the engine 1 and the first motor MG1 so that these target outputs are actually obtained.

The ECU 20 may implement a hybrid mode, which is a control mode for driving the vehicle 50 by both the engine 1 and the first motor MG1, an engine mode, which is a control mode for driving the vehicle 50 only by the engine 1, and a motor mode, which is a control mode for driving the vehicle 50 only by the first motor MG1.

Figure 2:
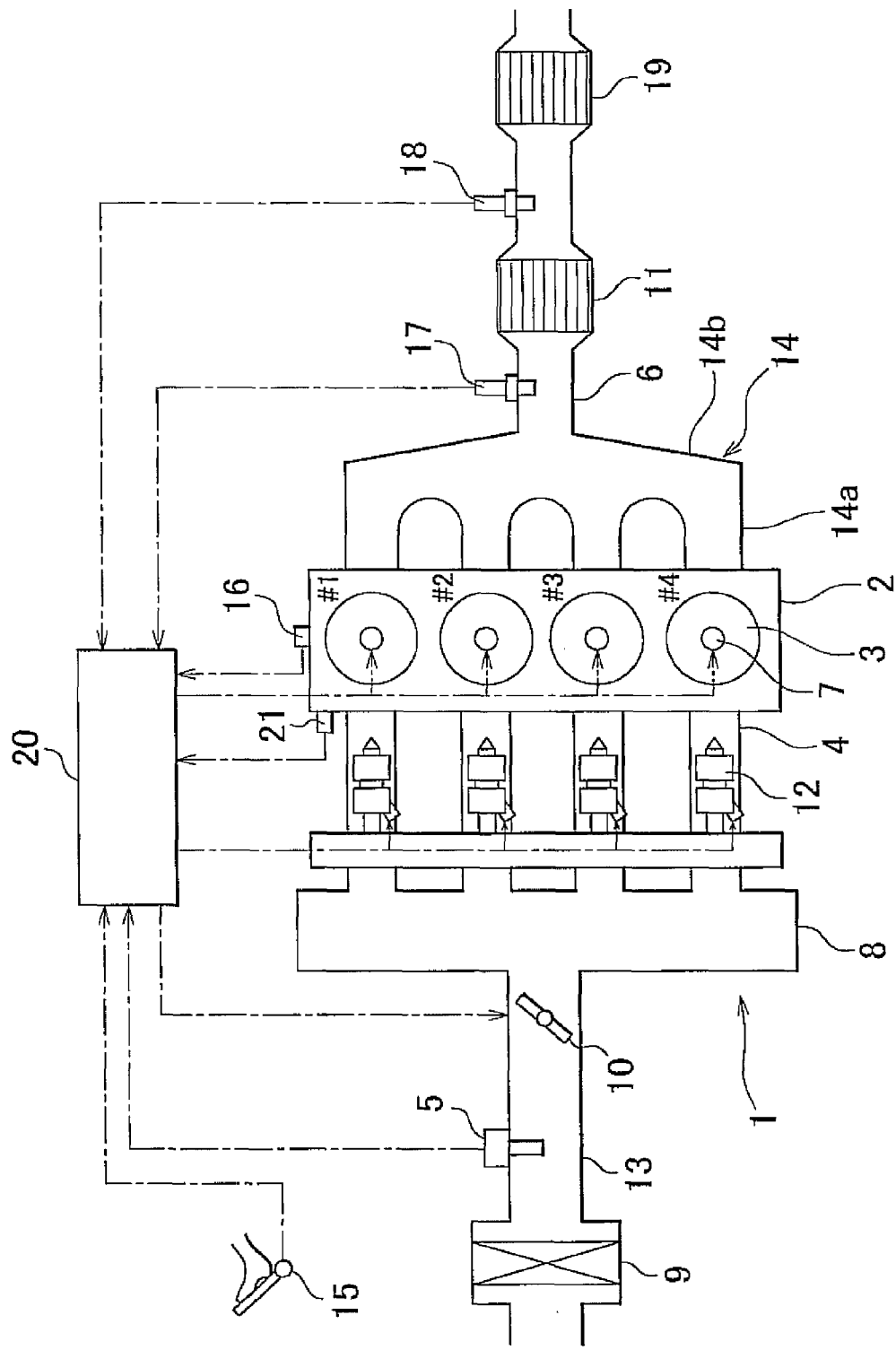
FIG. 2 is a schematic diagram of the internal combustion engine according to the embodiment.

The configuration of the engine 1 will be explained below with reference to FIG. 2. In the engine 1, a gas mixture of fuel and air is burned inside a combustion chamber 3 formed in a cylinder block 2, and a piston moves reciprocatingly inside the combustion chamber 3. The engine 1 of the embodiment is a multi-cylinder internal combustion engine, more specifically an in-line four-cylinder spark-ignited internal combustion engine. The internal combustion engine 1 is provided with cylinders #1 to #4. However, the number of cylinders and the engine system are not particularly limiting.

A cylinder head of the engine 1 is provided, for each cylinder, with an intake valve that opens and closes an intake port and an exhaust valve that opens and closes an exhaust port. The intake valves and exhaust valves are opened and closed by the dynamic valve mechanism including a camshaft. A sparkplug 7 for igniting the gas mixture inside the combustion chamber 3 is mounted, for each cylinder, on the top of the cylinder head.

An intake port of each cylinder is connected to a surge tank 8, which is an intake collection chamber, by a branch pipe 4 for each cylinder. An intake pipe 13 is connected upstream of the surge tank 8, and an air cleaner 9 is provided at the upstream end of the intake pipe 13. An air flowmeter 5 for detecting an intake air amount and an electronically controlled throttle valve 10 are incorporated, in the order of description from the upstream side, in the intake pipe 13. The intake port, branch pipe 4, surge tank 8, and intake pipe 13 form an intake passage.

An injector (fuel injection valve) 12 that injects fuel into the intake passage, more particularly into the intake port, is provided for each cylinder. The fuel injected from the injector 12 mixes with the intake air and forms a gas mixture, the gas mixture is sucked into the combustion chamber 3 when the intake valve is open, compressed by the piston, ignited by the sparkplug 7, and burned.

Meanwhile, the exhaust port of each cylinder is connected to an exhaust manifold 14. The exhaust manifold 14 is constituted by a branch pipe 14a for each cylinder that constitutes the upstream portion thereof and an exhaust collector 14b that constitutes the downstream portion thereof. The exhaust pipe 6 is connected to the downstream side of the exhaust collector 14b. The exhaust port, exhaust manifold 14, and exhaust pipe 6 form an exhaust passage.

Catalysts constituted by three-way catalysts, that is, an upstream catalyst 11 and a downstream catalyst 19, are mounted in series on the upstream side and downstream side of the exhaust pipe 6. First and second air-fuel sensors for detecting air-fuel ratio of the exhaust gas, that is, a pre-catalyst sensor 17 and a post-catalyst sensor 18, are disposed on the upstream side and downstream side of the upstream catalyst 11. These pre-catalyst sensor 17 and post-catalyst sensor 18 are disposed at positions immediately before and immediately after the upstream catalyst 11 and detect the fuel-air ratio based on oxygen concentration the exhaust gas. Thus, a single pre-catalyst sensor 17 is disposed in exhaust gas merging section upstream of the upstream catalyst 11.

The above-mentioned sparkplug 7, throttle valve 10, and injector 12 are electrically connected to the ECU 20. As shown in the figure, in addition to the abovementioned air flowmeter 5, pre-catalyst sensor 17, and post-catalyst sensor 18, a crank angle sensor 16 that detects a crank angle of the engine 1, an accelerator depression amount sensor 15 that detects an accelerator depression amount, a water temperature sensor 21 for detecting a coolant temperature of the engine 1, and various other sensors are electrically connected to the ECU 20. The ECU 20 controls the sparkplug 7, throttle valve 10, and injector 12 and also controls the ignition timing, fuel injection amount, fuel injection timing, and throttle opening degree based on detection values of these sensors so as to obtain the desired engine output. The throttle opening degree is controlled to a degree corresponding to the accelerator depression amount.

The ECU 20 calculates the engine revolution speed Ne (rpm) based on the output of the crank angle sensor 16. The engine revolution speed as referred to herein is an engine revolution per unit time and has the same meaning as the revolution velocity.

Figure 3:
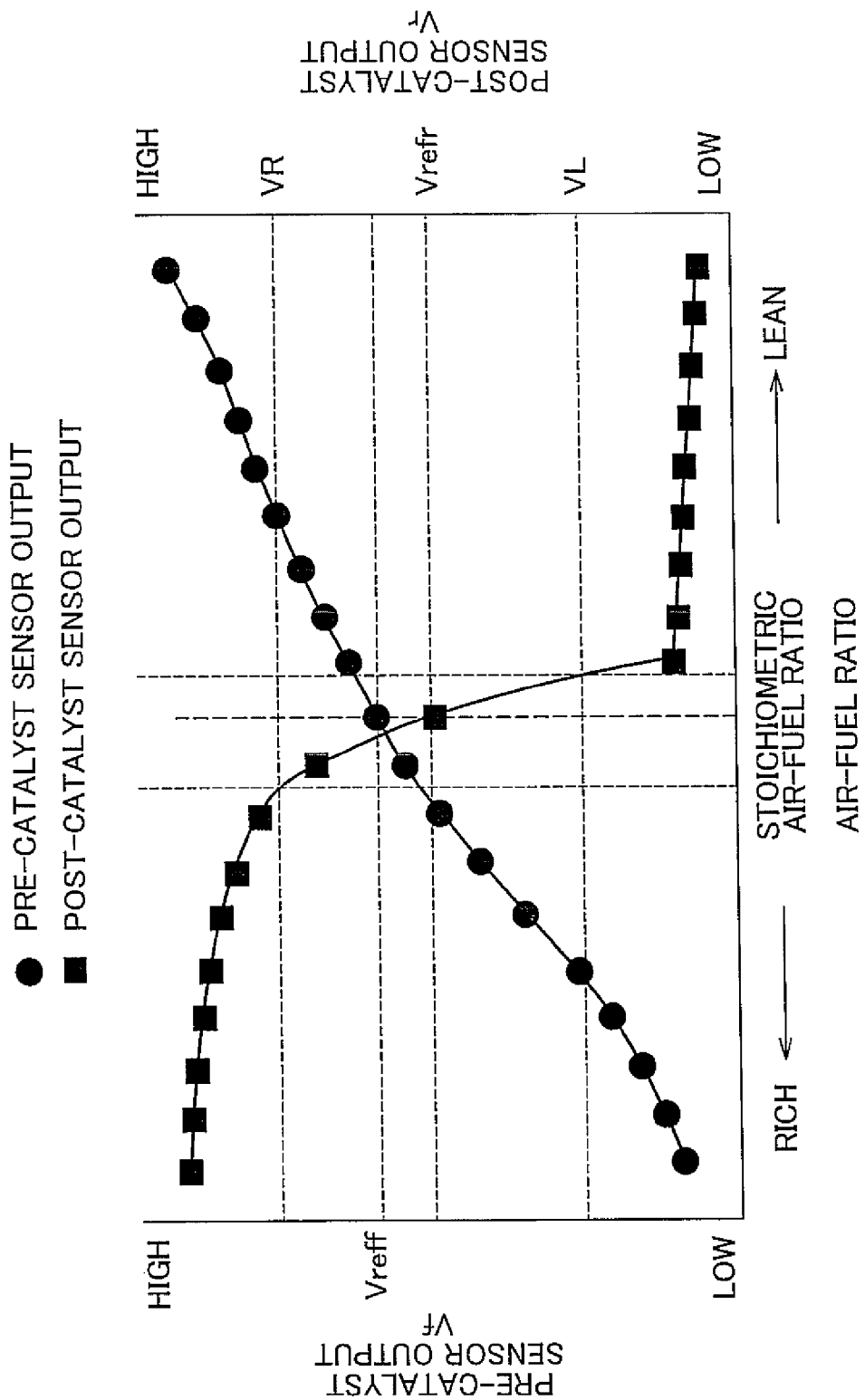
FIG. 3 a graph illustrating output characteristics of a pre-catalyst sensor and a post-catalyst sensor according to the embodiment.

The pre-catalyst sensor 17 is constituted by the so-called wide-range air-fuel ratio sensor and may continuously detect the air-fuel ratio within a comparatively wide range. FIG. 3 shows an output characteristic of the pre-catalyst sensor 17. As shown in the figure, the pre-catalyst sensor 17 outputs a voltage signal Vf of a size proportional to the exhaust air-fuel ratio. The output voltage at the time the exhaust air-fuel ratio is stoichiometric (stoichiometric air-fuel ratio, for example, A/F=14.6) is Vreff (for example, about 3.3 V).

Meanwhile, the post-catalyst sensor 18 is the so-called $O_2$ sensor and has a characteristic in which the output value changes rapidly on a stoichiometric value as a boundary. FIG. 3 shows the output characteristic of the post-catalyst sensor 18. As shown in the figure, the output voltage at the time the exhaust air-fuel ratio is stoichiometric, that is, the value corresponding to the stoichiometric state, is Vrefr (for example, 0.45 V). The output voltage of the post-catalyst sensor 18 changes within a predetermined range (for example, 0 to 1 V). Where the exhaust air-fuel ratio is leaner that the stoichiometric value, the output voltage of the post-catalyst sensor becomes less than the value Vrefr corresponding to the stoichiometric state, and when the exhaust air-fuel ratio is richer than the stoichiometric value, the output voltage of the post-catalyst sensor becomes higher than the value Vrefr corresponding to the stoichiometric state.

The upstream catalyst 11 and downstream catalyst 19 simultaneously purify NOx, HC, and CO, which are hazardous components contained in the exhaust gas, when the air-fuel ratio A/F of the exhaust gas flowing to the catalysts is close to the stoichiometric value. The width (window) of air-fuel ratio in which NOx, HC, and CO may be purified simultaneously with high efficiency is comparatively narrow.

The air-fuel ratio control (stoichiometry control) is implemented by the ECU 20 so as to control the air-fuel ratio of the exhaust gas flowing to the upstream catalyst 11 to the vicinity of the stoichiometric value. The air-fuel ratio control is constituted by the main air-fuel ratio control (main air-fuel ratio feedback control) such that matches the exhaust air-fuel ratio detected by the pre-catalyst sensor 17 with a stoichiometric value which is a predetermined target air-fuel ratio and an auxiliary air-fuel ratio control (auxiliary air-fuel ratio feedback control) such that matches the exhaust air-fuel ratio detected by the post-catalyst sensor 18 with the stoichiometric value. The auxiliary air-fuel ratio control may be omitted.

For example, let us assume that injectors 12 in some cylinders, from among all of the cylinders, have failed and an air-fuel ratio imbalance has occurred between the cylinders. For example, the case will be considered in which the fuel injection amount in cylinder #1 became higher than in cylinders #2, #3, and #4 and the air-fuel ratio shifted significantly to the rich side. In such a case, the air-fuel ratio of the total gas supplied to the pre-catalyst sensor 17 may still be controlled to the stoichiometric value if a comparatively large correction amount is imparted by the aforementioned main air-fuel ratio feedback control. However, where the cylinders are considered separately, it is clear that cylinder #1 has an air-fuel ratio richer than the stoichiometric value and cylinders #2, #3, and #4 have air-fuel ratios leaner than the stoichiometric value, and that the stoichiometric value is merely obtained as a total balance, which is undesirable from the standpoint of emission.

Accordingly, in the embodiment, the ECU 20 detects such an inter-cylinder air-fuel ratio imbalance abnormality, identifies an abnormal cylinder that has caused the abnormality, and corrects the fuel injection amount of the abnormal cylinder. As a result, the imbalance abnormality may be eliminated and emission degradation may be effectively prevented.

In the embodiment, an imbalance ratio (%) is used as a parameter representing the size of air-fuel imbalance. The imbalance ratio as referred to herein is a value indicating the degree to which the fuel injection amount in a cylinder (imbalance cylinder) in which fuel injection amount shift has occurred has shifted from the fuel injection amount (reference injection amount) of the cylinder (balance cylinder) in which the fuel injection amount shift has not occurred, when the fuel injection amount shift has occurred only in one cylinder from all of the cylinders. Where the imbalance degree is denoted by IB, the fuel injection amount in the imbalance cylinder is denoted by Qib, and the fuel injection amount in the balance cylinder, that is, the reference injection amount, is denoted by Qs, the imbalance degree may be represented as: "IB=(Qib−Qs)/Qs". The larger is the imbalance degree IB, the larger is the fuel injection amount shift of the imbalance cylinder relative to the balance cylinder, and the larger is the air-fuel ratio imbalance degree. A value other that the imbalance degree may be also used as the aforementioned parameter.

For example, when an air-fuel ratio imbalance abnormality has occurred, output fluctuations of the pre-catalyst sensor 17 become large. Therefore, the imbalance abnormality may be detected based on such output fluctuations. For example, where a differential value or a slope, or an average value of the pre-catalyst sensor output is equal to or higher than a predetermined value, it is a sign of abnormality.

Further, when an air-fuel ratio imbalance abnormality has occurred, output fluctuations of the post-catalyst sensor 18 increase and revolution speed fluctuations of the engine 1 are increased. Therefore, the imbalance abnormality may be also detected based on these fluctuations. These detection methods will be referred to hereinbelow as the usual methods.

These usual methods are sufficient when used to distinguish the normal state from the abnormal state, but may be insufficiently accurate when used to detect the accurate value of spread or shift, that is, the imbalance ratio. For example, the detection value may differ depending on the difference in engine operation conditions (revolution speed, intake air amount). In the embodiment, the fuel injection amount correction amount is changed according to the imbalance ratio. Therefore, the imbalance ratio should be accurately detected.

The comprehensive research conducted by the inventors demonstrated that when an air-fuel ratio imbalance abnormality occurs in the engine 1, the drive system of the first motor MG1 is also affected thereby. Accordingly, in the embodiment, this result is employed and a parameter relating to the drive system of the first motor MG1 is used as a parameter correlating with the imbalance ratio. The imbalance ratio is indirectly, but accurately detected and the injection fuel amount is accurately corrected.

Figure 4:
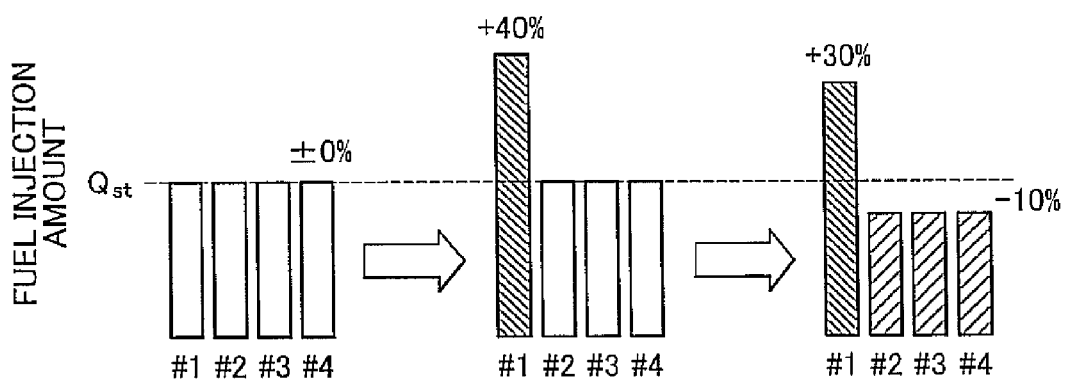
FIG. 4A to FIG. 4C are graphs illustrating the transition in a fuel injection amount of each cylinder when a rich-shift abnormality has occurred.

FIG. 4A to FIG. 4C are graphs illustrating the transition in a fuel injection amount of each cylinder in the case where an air-fuel ratio imbalance abnormality, in particular a rich-shift abnormality manifested by an excessive fuel injection amount in one cylinder only, has occurred.

FIG. 4A shows the fuel injection amount in each cylinder in the case prior to the occurrence of the abnormality, that is, when the fuel injection amount in each cylinder is normal. In this case, the fuel injection amount in each cylinder becomes a stoichiometric equivalent amount Qst as a result of the aforementioned stoichiometry control. The imbalance ratio in cylinders #1, #2, #3, and #4 is ±0%, as shown in the figure.

FIG. 4B shows the fuel injection amount in each cylinder at the point of time an abnormality occurs. In this case, the abnormality occurs in cylinder #1 and the fuel injection amount thereof becomes larger than the stoichiometric equivalent amount Qst. The fuel injection amount in other cylinders #2, #3, and #4 remains the stoichiometric equivalent amount Qst. For example, as shown in the figure, the imbalance ratio of cylinder #1 is +40%, and the imbalance ratio in the cylinders #2, #3, and #4 is ±0%. Cylinder #1 is an abnormal cylinder that causes imbalance abnormality and the cylinders #2, #3, and #4 are normal cylinders.

Where the aforementioned stoichiometry control is performed in this state, the fuel injection amount of all of the cylinders is corrected by equal reduction by 10% for each cylinder so that the air-fuel ratio of the total gas (exhaust gas of all of the cylinders) supplied to the pre-catalyst sensor 17 becomes a stoichiometric air-fuel ratio. Thus, even when a 40% rich-side shift occurs only in cylinder #1, the effect on the pre-catalyst sensor 17 will be 10% (40% divided by four, which is the number of cylinders), information on the occurrence of a 10% rich-side shift is obtained from the pre-catalyst sensor 17, and the ECU 20 corrects the fuel injection amount of all of the cylinders by equal reduction by 10% for each cylinder.

Where a predetermined time interval elapses after such correction by reduction has been started, the fuel injection amount of each cylinder changes as shown in FIG. 4C, the fuel injection amount of cylinder #1 becomes richer by an equivalent of 30% than the stoichiometric equivalent amount Qst, and the injection fuel amount of each of other cylinders #2, #3, and #4 becomes leaner by an equivalent of 10% than the stoichiometric equivalent amount Qst. In other words, as shown in the figure, the imbalance ratio of cylinder #1 is +30%, and the imbalance ratio of cylinders #2, #3, and #4 is −10%.

Accordingly, the sum total output of cylinders #2, #3, and #4 with an air-fuel ratio leaner than the stoichiometric ratio decreases by an equivalent of 30% (=10%×3) with respect to the normal state shown in FIG. 4A. When the air-fuel ratio of a certain cylinder becomes richer than the stoichiometric ratio, the output of this cylinder does not change that much with respect to the output in the stoichiometric state.

The output of the engine is thus decreased by an equivalent of 30% with respect to that prior to the occurrence of abnormality. Where the motor power is assumed to be zero, the engine output decreases by an equivalent of 30% with respect to the target power.

Accordingly, the first motor MG1 is actuated or works in order to compensate the aforementioned reduction in output and the battery state-of-charge SOC is reduced due to such an actuation. Thus, the first motor MG1 performs extra work corresponding to the reduction in engine output so as to obtain an actual output that is equal to the target output from both the engine and the first motor MG1. In the case where the first motor MG1 was stopped prior to the occurrence of abnormality (the case of the engine mode), the first motor MG1 is actuated after the abnormality has occurred. In the case where the first motor MG1 was actuated prior to the occurrence of abnormality (the case of the hybrid mode), the operation amount of the first motor MG1 is increased after the abnormality has occurred.

According to the first aspect of the embodiment, the fuel injection amount of the abnormal cylinder is corrected based on the battery stage-of-charge reduction amount. According to the second aspect of the embodiment, the fuel injection amount of the abnormal cylinder is corrected based on the difference in output of the first motor MG1 between before and after the occurrence of abnormality.

Figure 5:
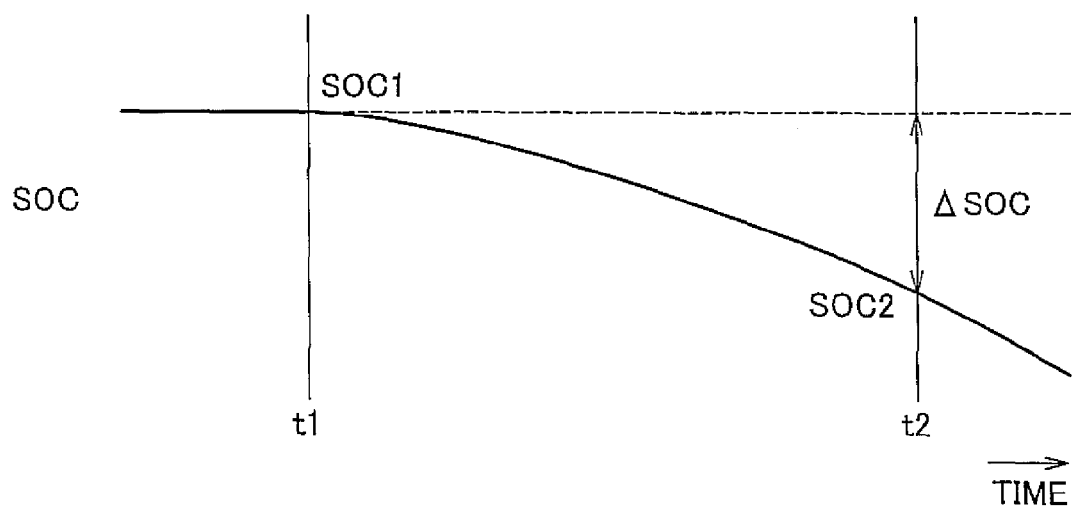
FIG. 5 is a time chart illustrating the decrease in battery state-of-charge when an imbalance abnormality has occurred.

As shown in FIG. 5, within a time interval from the abnormality occurrence time t1 to the predetermined elapsed time t2 at which the air-fuel ratio of all of the cylinders finally steadies down, the battery state-of-charge SOC decreases by ΔSOC. This battery state-of-charge reduction amount ΔSOC is nothing but a value correlated with the imbalance degree of the abnormal cylinder at the abnormality occurrence time t1. This is because the air-fuel ratio of normal cylinders shifts further to the lean side with respect to the stoichiometric ratio, the engine output reduction amount increases, and the work amount of the first motor MG1 increases as the imbalance degree of the abnormal cylinder at the abnormality occurrence time t1 increases. Therefore, the accurate detection of imbalance ratio and correction of fuel injection amount may be performed based on this battery state-of-charge reduction amount ΔSOC.

Further, as shown in FIG. 6, within a time interval from the abnormality occurrence time t1 to the predetermined elapsed time t2 at which the air-fuel ratio of all of the cylinders finally steadies down, the output of the first motor MG1 increases by ΔT. This motor output difference ΔT is nothing by a value correlated with the imbalance degree of the abnormal cylinder at the abnormality occurrence time t1. This is because, the air-fuel ratio of normal cylinders shifts further to the lean side with respect to the stoichiometric ratio, the engine output reduction amount increases, and the work amount of the first motor MG1 increases as the imbalance degree of the abnormal cylinder at the abnormality occurrence time t1 increases. Therefore, the accurate detection of imbalance ratio and correction of fuel injection amount may be also performed based on this motor output difference ΔT.

The first aspect in which the battery state-of-charge reduction amount ΔSOC is used will be explained below in greater detail.

Figure 7:
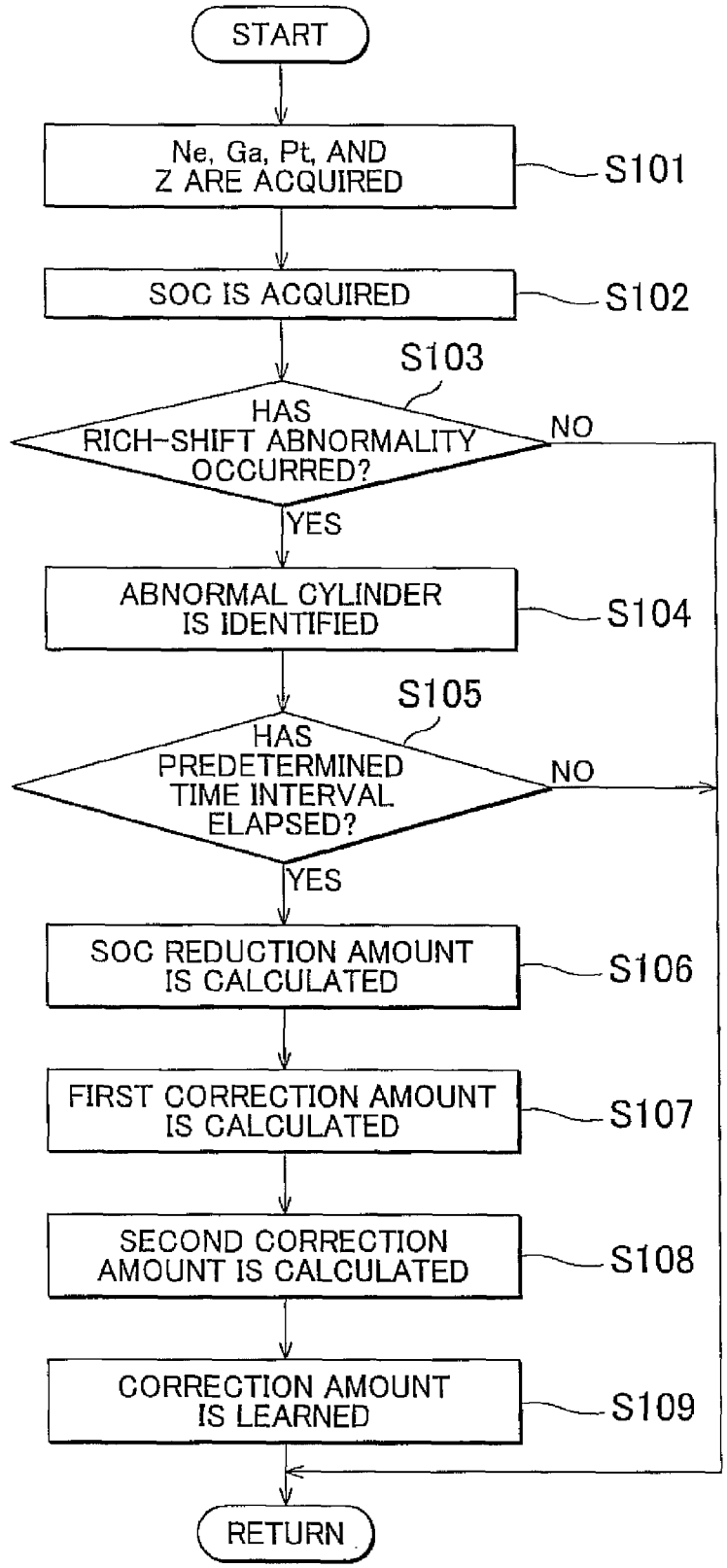
FIG. 7 is a flowchart illustrating a routine relating to fuel injection amount correction in the case where a rich-shift abnormality has occurred in the configuration according to the first aspect of the embodiment.

FIG. 7 is a flowchart illustrating a routine relating to fuel injection amount correction in the case where a rich-shift abnormality has been detected as an imbalance abnormality. This routine may be repeatedly implemented by the ECU 20 with a predetermined calculation period (for example 4 ms). Further, this routine is preferably implemented during stoichiometry control of the engine and also during stationary running in which the running state of the vehicle is substantially unchanged.

First, in step S101, various values, such as engine revolution speed Ne, intake air amount Ga, target output Pt, and exhaust air-fuel ratio Z are acquired. The engine revolution speed Ne is a value calculated by the ECU 20 based on the output of the crank angle sensor 16. The intake air amount Ga is a value detected by the air flowmeter 5. The target output Pt is a value calculated, as described hereinabove, by the ECU 20 based on, for example, an accelerator depression amount Ac detected by the accelerator depression amount sensor 15 and a vehicle speed V detected by the vehicle speed sensor 64. The exhaust air-fuel ratio Z is a value detected by the pre-catalyst sensor 17.

Then, in step S102, the value of battery state-of-charge SOC calculated by the ECU 20 is acquired.

Figure 8:
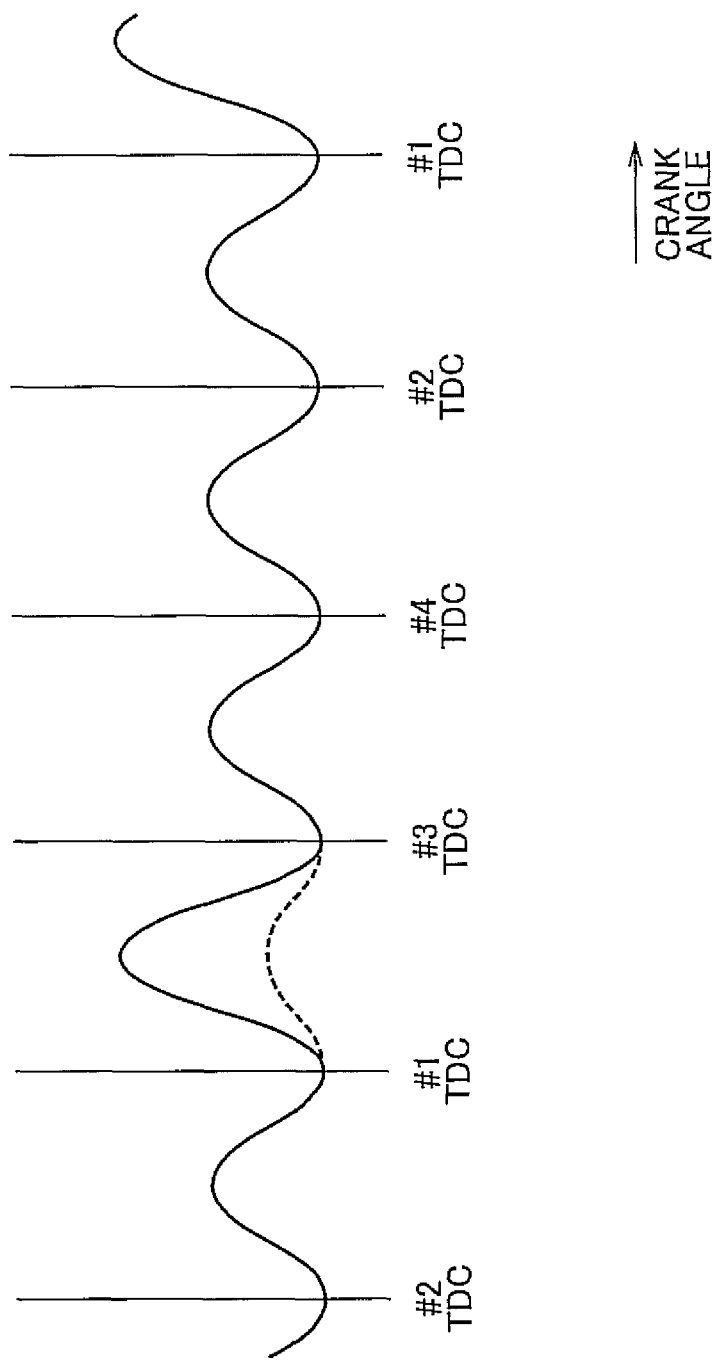
FIG. 8 explains a method for detecting an imbalance abnormality and identifying an abnormal cylinder; this figure shows a revolution speed waveform of the engine.

Then, in step S103, it is determined whether or not a rich-shift abnormality has occurred, that is, whether or not a rich-shift abnormality has been detected. This determination is made, for example, based on the waveform of the engine revolution speed Ne such as shown in FIG. 8.

Thus, when a rich-shift abnormality such as shown in FIG. 4B occurs, the generated output of cylinder #1 increases, although insignificantly, with respect to the generated output of cylinders #2, #3, and #4. Accordingly, this difference in the generated output is manifested as a difference in revolution waveform between the cylinders such as shown in FIG. 8. As shown by a solid line in the figure, the revolution speed increase ratio or revolution speed increase amount immediately after the top dead center (TDC) of cylinder #1 becomes larger than the revolution speed increase ratio or revolution speed increase amount immediately after the TDC of other cylinders #2, #3, and #4. Therefore, it is determined that a rich-shift abnormality has occurred when a difference in revolution speed increase ratio or revolution speed increase amount appears between the cylinders. For example, when there is a cylinder for which the revolution speed increase ratio or revolution speed increase amount is larger by a value equal to or greater than a predetermined value than an all-cylinders average value of the revolution speed increase ratio or revolution speed increase amount for each cylinder, it is determined that a rich-shift abnormality has occurred. When a rich-shift abnormality is determined not to have occurred, the routine is ended. Meanwhile, when a rich-shift abnormality is determined to have occurred, the processing advances to step S104, and a cylinder in which the rich-shift abnormality has occurred is identified. When such abnormal cylinder is identified, a cylinder with the largest revolution speed increase ratio or revolution speed increase amount may be identified as a rich-shift abnormal cylinder based on the revolution speed waveform shown in FIG. 8. Alternatively, a cylinder for which the revolution speed increase ratio or revolution speed increase amount has shifted the most to the increase side with respect to the all-cylinders average value of revolution speed increase ratio or revolution speed increase amount may be identified as a rich-shift abnormal cylinder.

In another method, a rich-shift abnormality may be detected and an abnormal cylinder may be identified based on electric output of the second motor MG2 serving as a generator. This is because in a state in which the second motor MG2 is driven at least by the engine 1, the electric output drawing a waveform identical to the revolution speed waveform of the engine is obtained from the second motor MG2.

Figure 9:
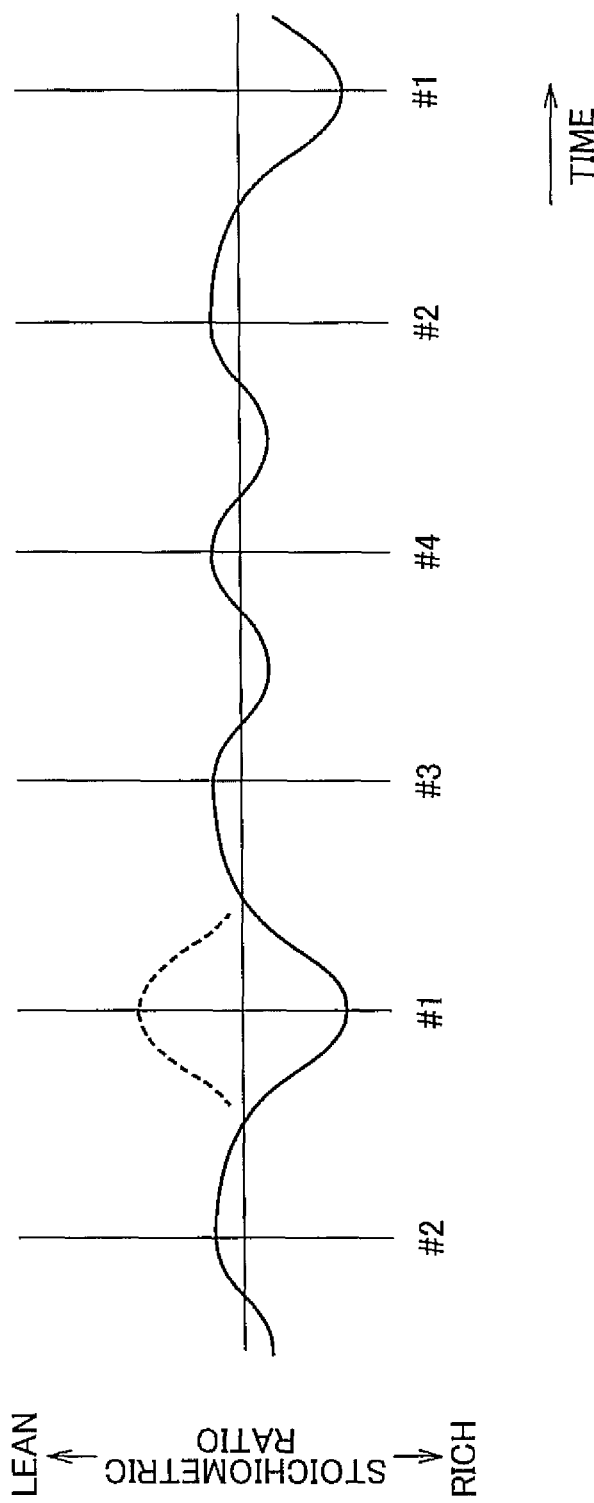
FIG. 9 explains another method for detecting an imbalance abnormality and identifying an abnormal cylinder; this figure shows an output waveform of a pre-catalyst sensor.

In yet another method, a rich-shift abnormality may be detected and an abnormal cylinder may be identified based on the output of the pre-catalyst sensor 17. FIG. 9 shows a waveform of output air-fuel ratio A/F calculated from the output voltage Vf of the pre-catalyst sensor 17. The output air-fuel ratio A/F of the pre-catalyst sensor 17 is a value corresponding to an exhaust air-fuel ratio of exhaust gas of each cylinder before the gas reaches the pre-catalyst sensor 17. Where a rich-shift abnormality has occurred in cylinder #1 in this case, the output air-fuel ratio A/F corresponding to the exhaust gas of cylinder #1 shifts to the rich side relative to the output air-fuel ratio A/F corresponding to the exhaust gas of other cylinders #2, #3, and #4 and becomes rich with respect to the stoichiometric ratio, as shown by a solid line. Therefore, when such a difference in output air-fuel ratio A/F appears between the cylinders, it is possible to determine that a rich-shift abnormality has occurred. For example, when there is a cylinder for which the output air-fuel ratio A/F is obtained that has shifted to a rich side with respect to a stoichiometric ratio by a value equal to or greater than a predetermined value, it may be determined that a rich-shift abnormality has occurred and this cylinder may be identified as a rich-shift abnormal cylinder.

A time delay caused by transport delay or the like occurs within a time interval after the exhaust gas of the cylinders is actually discharged from the cylinders and before the exhaust gas reaches the pre-catalyst sensor 17, and the ECU 20 may calculate this time delay based on the detection value of intake air amount, which is the representative value of the exhaust gas flow rate. Further, the ECU 20 may recognize the cylinder from which the exhaust gas is discharged and the timing at which the exhaust gas is discharged based on the cylinder determination function itself. Therefore, based on this information, the ECU 20 may determine the cylinder which generates the exhaust gas with the air-fuel ratio A/F that is the air-fuel ratio A/F detected by the pre-catalyst sensor 17.

Returning to FIG. 7, where the abnormal cylinder is thus identified, the processing advances to step S105 and it is determined whether a predetermined time interval has elapsed since the imbalance abnormality detection time, that is, the rich-shift abnormality occurrence time. The reason for waiting for the predetermined time interval to elapse is that it is necessary to wait till the air-fuel ratio or fuel injection amount of each cylinders is steadied down to the state shown in FIG. 4C by executing the stoichiometry control.

Where the predetermined time interval has not elapsed, the routine is ended. Meanwhile, where the predetermined time interval has elapsed, the processing advances to step S106, and the battery state-of-charge reduction amount ΔSOC in the interval from when the rich-shift abnormality has occurred to the present time is calculated. This calculation is performed by subtracting a present battery state-of-charge SOC2 from the battery state-of-charge SOC1 at the time the rich-shift abnormality has occurred (see FIG. 5).

Then, in step S107, a correction amount for correcting the fuel injection amount of the abnormal cylinder is calculated based on the battery state-of-charge reduction amount ΔSOC. The correction amount calculated herein will be referred to as a first correction amount, and the correction performed by using the first correction amount will be referred to as a first correction. When the first correction amount is calculated, the first correction amount corresponding to the battery state-of-charge reduction amount ΔSOC is calculated by using the map (may be also a function; same hereinbelow) that has been stored in advance in the ECU 20. The first correction amount is added to or multiplied by a basic injection amount determined based on engine operation conditions (for example, revolution speed and target engine output). The relationship between the battery state-of-charge reduction amount ΔSOC and the first correction amount is determined in advance in the map.

For example, in the example shown in FIG. 4A to FIG. 4C, the first correction amount is calculated such that the basic injection amount Qb of cylinder #1, which is the abnormal cylinder, is corrected by reduction by +40%. For example, when the first correction amount is a multiplication value, the first correction amount of 0.6 corresponding to the battery state-of-charge reduction amount ΔSOC is calculated, and the fuel injection amount Q1 after the first correction becomes "Q1=0.6×Qb". Since the imbalance ratio increases with the increase in battery state-of-charge reduction amount ΔSOC, the first correction amount as a multiplication value is less than 1.

Where such first correction is implemented, the rich-shift of the abnormal cylinder is eliminated, and where the stoichiometry control is thereafter implemented within the predetermined time interval, as shown in FIG. 4A the fuel injection amount of cylinder #1 is made equal to the fuel injection amount of other cylinders #2, #3, and #4 and matched with the stoichiometric equivalent amount Qst.

It could be easily understood by person skilled in the art that when the first correction amount is an addition value, the correction may be similarly performed.

The contents of the first correction, which is the main correction, are described above. In the embodiment, the second correction amount, which is of secondary importance, is calculated in step S108 in order to increase further the accuracy. Summarizing, the second correction performed by using the second correction amount, is aimed at the elimination of detection error of the pre-catalyst sensor 17 caused by the effect of hydrogen contained in the exhaust gas.

Thus, when the air-fuel ratio in a certain cylinder shifts to the rich side from the stoichiometric ratio, the concentration of hydrogen in the exhaust gas of this cylinder increases dramatically. The resultant characteristic is that the detected air-fuel ratio of the pre-catalyst sensor 17 somewhat shifts to the rich side from the true air-fuel ratio under the effect of this hydrogen.

The contents of the second correction will be explained below by the example shown in FIG. 4A to FIG. 4C with consideration for the aforementioned characteristic. In the first correction, in a state shown in FIG. 4B it is determined that a rich shift of a total of 10% has occurred from the detection value of the pre-catalyst sensor 17 and a 40% reduction correction is performed with respect to the abnormal cylinder. However, the true air-fuel ratio is shifted to the rich side, for example, by a total of only 9%, and the remaining 1% is the detection error caused by the effect of hydrogen. A 36% (=9%×4) reduction correction may be performed according to the true air-fuel ratio, but actual reduction correction performed in the first correction is 40% and therefore the reduction is too large. As a result, the NOx discharge amount may be increased. For this reason, a 4% (=40%−36%) increase correction is performed in the second correction in order to eliminate the detection error caused by the effect of hydrogen.

Where the imbalance ratio becomes large on the plus side, that is, rich side, the detection effort caused by the effect of hydrogen increases and the battery state-of-charge reduction amount ΔSOC also increases. Accordingly, in this case, a second correction amount corresponding to the battery state-of-charge reduction amount ΔSOC is calculated by using the map that has been stored in advance in the ECU 20, and the second correction amount is added to or multiplied by the fuel injection amount Q1 after the first correction.

For example, in the example shown in FIG. 4A to FIG. 4C, the second correction amount such that enables a 4% increase correction of the fuel injection amount Q1 after the first correction of cylinder #1, which is the abnormal cylinder, is calculated. For example, when the second correction amount is a multiplication value, the second correction amount of 1.04 corresponding to the battery state-of-charge reduction amount ΔSOC is calculated and the fuel injection amount Q2 after the second correction becomes "Q2=1.04×Q1". Since the imbalance ratio increases and the detection error caused by the effect of hydrogen also increases with the increase in battery state-of-charge reduction amount ΔSOC, the second correction amount as a multiplication value is larger than 1.

Where such second correction is implemented, the excess reduction correction caused by the effect of hydrogen is eliminated, and where the stoichiometry control is thereafter implemented within the predetermined time interval, the fuel injection amount of cylinder #1 is made equal to the fuel injection amount of other cylinders #2, #3, and #4 and matched with the stoichiometric equivalent amount Qst, thereby implementing further correction than the first correction as shown in FIG. 4A.

It could be easily understood by person skilled in the art that when the second correction amount is an addition value, the correction may be similarly performed.

Where the second correction amount has thus been calculated, the first and second correction amounts are then learned by and stored in the ECU 20 in step S109 and the routine is ended. For example, in the above-described example, the first correction amount of 0.6 and the second correction amount of 1.04 are learned. These learned values are used continuously in the subsequent fuel injection amount control till the basic reason for the imbalance abnormality is eliminated (for example, till the failed injector 12 of the abnormal cylinder is replaced). In other words, the first and second correction using the first and second correction amounts that have been learned are continuously implemented in the subsequent fuel injection amount control. As a result, emission degradation that accompanies the occurrence of imbalance abnormality may be prevented.

In particular, when the engine is stopped and then cold restarted, the fuel injection amount is controlled by feedforward control till the engine is warmed up, but the first and second correction amounts that have been learned are also used in this period and the first and second correction are implemented. As a result, cold emission degradation occurring when cold start is performed in the imbalance abnormality state may be prevented.

In the case of stoichiometry control, feedback correction of the fuel injection amount Q2 after the second correction is performed based on the difference between the detected air-fuel ratio and stoichiometric ratio.

The first aspect in which the battery state-of-charge reduction amount ΔSOC is used will be explained below in relation to the correction of fuel injection amount in the case where a lean-shift abnormality has been detected as imbalance abnormality.

Figures 10A, 10B, 10C:
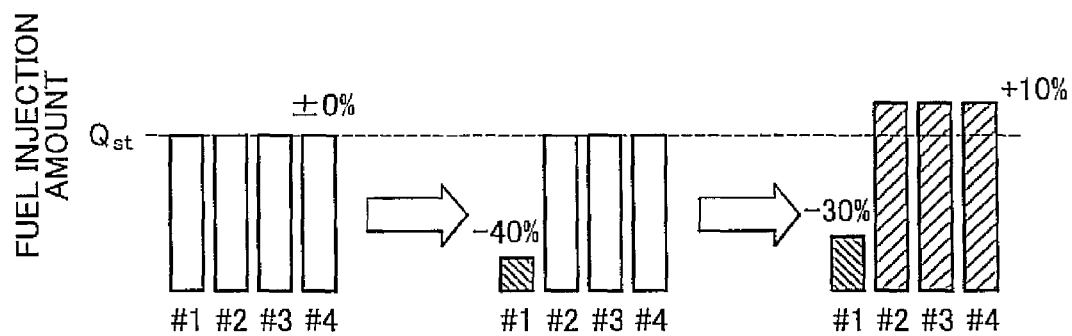
FIG. 10A to FIG. 10C are graphs illustrating the transition in a fuel injection amount of each cylinder when a lean-shift abnormality has occurred.

FIG. 10A to FIG. 10C show a graph that is similar to that shown in FIG. 4A to FIG. 4C and particularly illustrates the transition in a fuel injection amount of each cylinder when a lean-shift abnormality (the fuel injection amount of one cylinder only is too small) has occurred as an air-fuel ratio imbalance abnormality.

FIG. 10A shows the fuel injection amount of each cylinder before an abnormality has occurred, that is, in the case where the fuel injection amount of each cylinder is normal. In this case, the fuel injection amount of each cylinder becomes the stoichiometric equivalent amount Qst as a result of the aforementioned stoichiometry control. As shown in the figure, the imbalance ratio of cylinders #1, #2, #3, and #4 is ±0%.

FIG. 10B shows the fuel injection amount of each cylinder when an abnormality occurs. In this case, the fuel injection amount of cylinder #1 is less than the stoichiometric equivalent amount Qst and the fuel injection amount of other cylinders #2, #3, and #4 is the stoichiometric equivalent amount Qst. For example, as shown in the figure, the imbalance ratio of cylinder #1 is −40%, and the imbalance ratio of cylinders #2, #3, and #4 is ±0%. Cylinder #1 is an abnormal cylinder that causes the imbalance abnormality, and cylinders #2, #3, and #4 are normal cylinders.

Where the aforementioned stoichiometry control is performed in this state, the fuel injection amount of all of the cylinders is corrected by equal increase by 10% for each cylinder so that the air-fuel ratio of the total gas (exhaust gas of all of the cylinders) supplied to the pre-catalyst sensor 17 becomes a stoichiometric air-fuel ratio. Thus, even if a 40% lean-side shift occurs only in cylinder #1, the effect on the pre-catalyst sensor 17 will be 10% (40% divided by four, which is the number of cylinders), information on the occurrence of a 10% lean-side shift is obtained from the pre-catalyst sensor 17, and the ECU 20 corrects the fuel injection amount of all of the cylinders by equal increase by 10% for each cylinder.

Where a predetermined time interval elapses after such correction by increase has been started, the fuel injection amount of each cylinder changes as shown in FIG. 10C, the fuel injection amount of cylinder #1 becomes leaner by an equivalent of 30% than the stoichiometric equivalent amount Qst, and the injection fuel amount of each of other cylinders #2, #3, and #4 becomes richer by an equivalent of 10% than the stoichiometric equivalent amount Qst. In other words, as shown in the figure, the imbalance ratio of cylinder #1 is −30%, and the imbalance ratio of cylinders #2, #3, and #4 is +10%.

Accordingly, the total output of the engine decreases under the effect of cylinder #1, which is leaner than stoichiometry, by an equivalent of 30% with respect to that before the abnormality has occurred.

Accordingly, the first motor MG1 is actuated or works in order to compensate the aforementioned reduction in output and the battery state-of charge is reduced due to such an actuation. Therefore, the fuel injection amount of the abnormal cylinder is corrected based on the battery state-of-charge reduction amount in the same manner as in the case of rich-shift abnormality.

Figure 11:
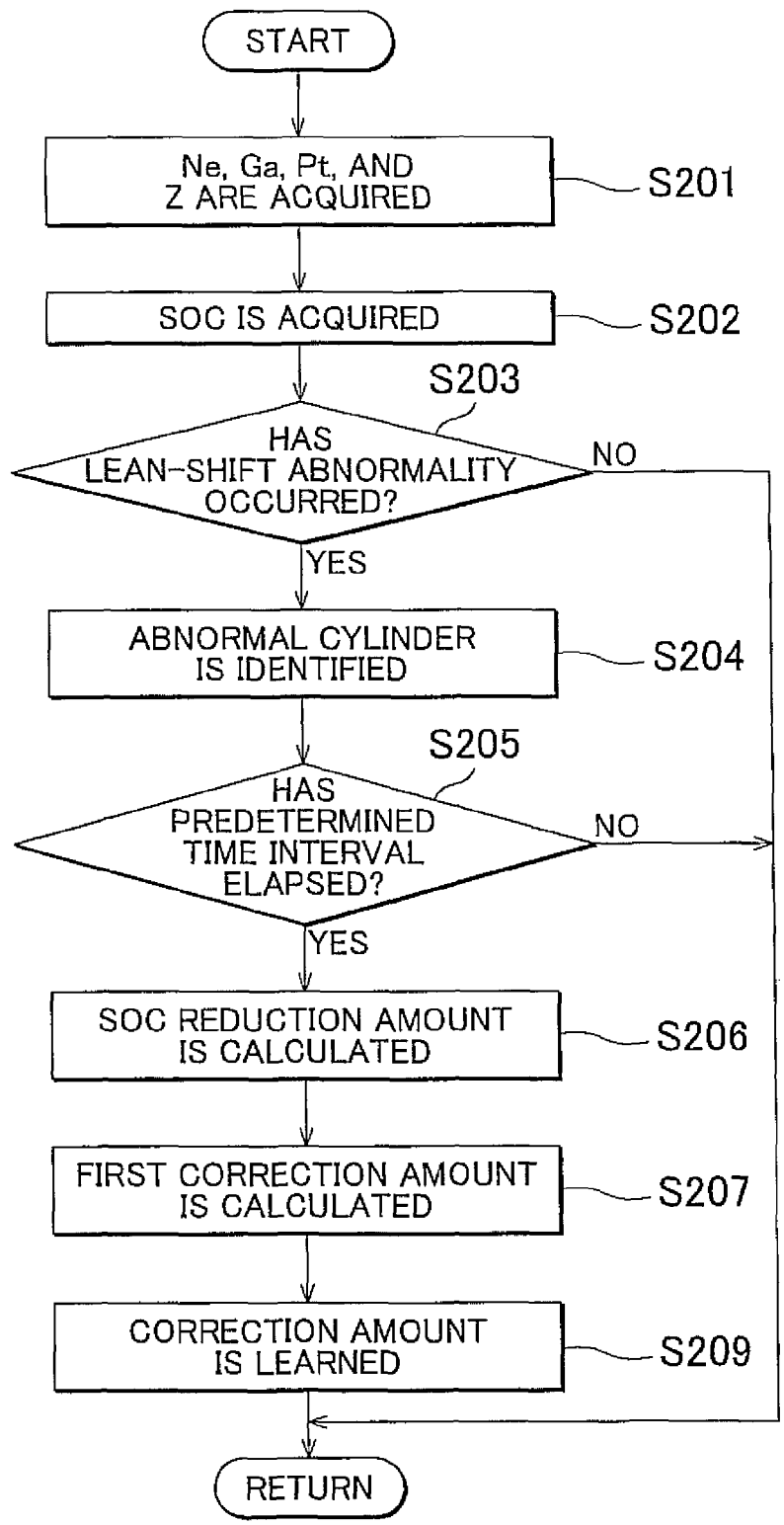
FIG. 11 is a flowchart illustrating a routine relating to fuel injection amount correction in the case where a lean-shift abnormality has occurred in the configuration according to the first aspect of the embodiment.

FIG. 11 shows a routine relating to fuel injection amount correction in the case where a lean-shift abnormality has been detected. The routine shown in FIG. 11 is substantially similar to the routine shown in FIG. 7, the difference therebetween being that step S103 is replaced with step S203 and step S108 is omitted. Other steps S201, S202, S204 to S207, and S209 are identical to steps S101, S102, S104 to S107, and S109 of FIG. 7.

As shown in FIG. 11, in step S203, it is determined whether or not a lean-shift abnormality has occurred, that is, whether or not a lean-shift abnormality has been detected. This determination is performed by the usual method similarly to the determination of rich-shift abnormality, for example based on the waveform of the engine revolution speed Ne such as shown in FIG. 8.

Thus, when a lean-shift abnormality such as shown in FIG. 10B occurs, the generated power of cylinder #1 becomes less than the generated power of cylinders #2, #3, and #4. Accordingly, this difference in the generated output is manifested as a difference in revolution waveform between the cylinders such as shown in FIG. 8. As shown by a broken line in the figure, the revolution speed increase ratio or revolution speed increase amount immediately after the TDC of cylinder #1 becomes less than the revolution speed increase ratio or revolution speed increase amount immediately after the TDC of other cylinders #2, #3, and #4. Therefore, it is determined that a lean-shift abnormality has occurred when a difference in revolution speed increase ratio or revolution speed increase amount appears between the cylinders. For example, when there is a cylinder for which the revolution speed increase ratio or revolution speed increase amount is less by a value equal to or greater than a predetermined value than an all-cylinders average value of the revolution speed increase ratio or revolution speed increase amount for each cylinder, it is determined that a lean-shift abnormality has occurred. When a lean-shift abnormality is determined not to have occurred, the routine is ended. Meanwhile, when a lean-shift abnormality is determined to have occurred, the processing advances to step S204, and a cylinder in which the lean-shift abnormality has occurred is identified. During such abnormal cylinder specification, a cylinder with the smallest revolution speed increase ratio or revolution speed increase amount may be identified as a lean-shift abnormal cylinder based on the revolution speed waveform shown in FIG. 8. Alternatively, a cylinder for which the revolution speed increase ratio or revolution speed increase amount has shifted the most to the decrease side with respect to the all-cylinders average value of revolution speed increase ratio or revolution speed increase amount may be identified as a lean-shift abnormal cylinder.

Similarly to the case of rich-shift abnormality, as another method, a lean-shift abnormality may be detected and an abnormal cylinder may be identified based on electric output of the second motor MG2 serving as a generator.

Further, similarly to the case of rich-shift abnormality, in another method, a lean-shift abnormality may be detected and an abnormal cylinder may be identified based on the output of the pre-catalyst sensor 17. As shown in FIG. 9, where a lean-shift abnormality has occurred, for example, in cylinder #1, the output air-fuel ratio A/F corresponding to the exhaust gas of cylinder #1 shifts to the lean side relative to the output air-fuel ratio A/F corresponding to the exhaust gas of other cylinders #2, #3, and #4 and becomes the leanest with respect to the stoichiometric ratio, as shown by a broken line. Therefore, when such a difference in output air-fuel ratio A/F appears between the cylinders, it is possible to determine that a lean-shift abnormality has occurred. For example, when there is a cylinder for which the output air-fuel ratio A/F is obtained that has shifted to a lean side with respect to a stoichiometric ratio by a value equal to or greater than a predetermined value, it may be determined that a lean-shift abnormality has occurred and this cylinder may be identified as a lean-shift abnormal cylinder.

The processing of steps after the abnormal cylinder has been identified is performed in the same manner as in the case of rich-shift abnormality. Thus, in step S205, it is determined whether a predetermined time interval has elapsed since the lean-shift abnormality occurrence time. Where the predetermined time interval is determined to have elapsed, the battery state-of-charge reduction amount $\Delta SOC$ in the interval from when the lean-shift abnormality has occurred to the present time is calculated in step S206.

Then, in step S207, the first correction amount for correcting the basic injection amount Qb of the abnormal cylinder with the object of eliminating the lean shift of the abnormal cylinder is calculated based on the battery state-of-charge reduction amount $\Delta SOC$.

The first correction amount is thereafter learned by the ECU 20 in step S209 and the routine is ended.

Step S108 in which the second correction, which takes the effect of hydrogen into account, is herein omitted because, as shown in FIG. 10B, there is no cylinder that has shifted to the rich side when the imbalance abnormality has occurred, and the detection error of the pre-catalyst sensor 17 caused by the effect of hydrogen may be considered to be substantially zero. Where the stoichiometry control is implemented, a transition is made to the state such as shown in FIG. 10C and therefore, the second correction may be implemented with the object of eliminating the effect of hydrogen caused by a certain rich shift in the normal cylinders in this process.

The second aspect in which the difference in output of the first motor MG1 is used will be explained below.

As has been explained with reference to FIG. 6, within a time interval from the abnormality occurrence time t1 to the predetermined elapsed time t2 at which the air-fuel ratios of all of the cylinders converge to the final value, the output of the first motor MG1 increases by $\Delta T$. This motor output difference $\Delta T$ is used in the second aspect as a parameter correlating with the imbalance ratio, and the fuel injection amount correction of the abnormal cylinder is performed based on the motor output difference $\Delta T$. In this case, the motor output difference $\Delta T$ is taken as a value obtained by subtracting the motor output T1 at the abnormality occurrence time t1 from the motor output T2 at the predetermined elapsed time t2. The output of the first motor MG1 may be accurately calculated based on the value of current supplied to the first motor MG1. Therefore, by using the output of the first motor MG1 to detect the imbalance ratio, it is possible to detect the imbalance ratio accurately.

Comparing the first aspect and the second aspect, there is a proportional relationship between the battery state-of-charge reduction amount $\Delta SOC$ and motor output difference $\Delta T$. Thus, when the battery state-of-charge reduction amount $\Delta SOC$ is large, the motor output difference $\Delta T$ is increased, and when the battery state-of-charge reduction amount $\Delta SOC$ is small, the motor output difference $\Delta T$ decreases. This is because, power consumption in the battery 53 increases with the increase in the work amount of the first motor MG1.

Therefore, where the battery state-of-charge reduction amount $\Delta SOC$ of the first aspect is substituted with the motor output difference $\Delta T$, the correction method of the first aspect may be also applied to the second aspect.

Figure 12:
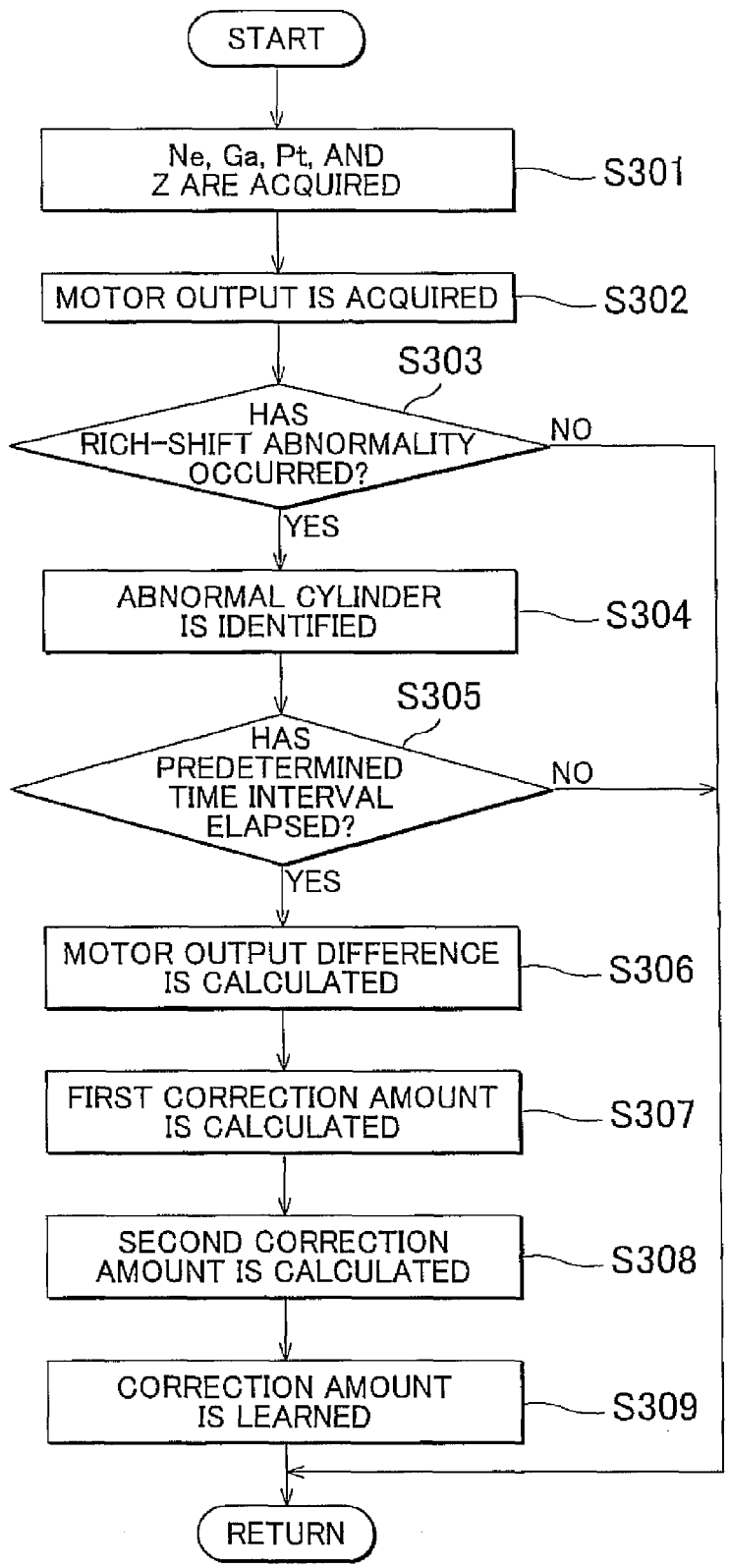
FIG. 12 is a flowchart illustrating a routine relating to fuel injection amount correction in the case where a rich-shift abnormality has occurred in the configuration according to the second aspect of the embodiment.

FIG. 12 shows a routine relating to fuel injection amount correction in the case where the rich-shift abnormality is detected in the second aspect corresponding to FIG. 7. The routine in FIG. 12 is almost similar to the routine in FIG. 7, the difference therebetween being only that step S102 is replaced with step S302 and step S106 is replaced with step S306. The remaining steps S301, S303 to S305, and S307 to S309 are similar to steps S101, S103 to S105, and S107 to S109 shown in FIG. 7.

In step S302, the motor output T of the first motor MG1 is acquired. Thus, the ECU 20 uses the map that has been stored in advance and calculates the motor output T of the first motor MG1 repeatedly based on the current supplied to the first motor MG1 that has been detected by the current sensor. In step S302, the value of the motor output T calculated at the present point of time is acquired.

In step S306, the motor output difference $\Delta T$ between when the rich-shift abnormality has occurred and the present point of time (a predetermined time interval has elapsed) is calculated. Thus, the ECU 20 calculates the motor output difference $\Delta T$ by subtracting the motor output T1 at the time the rich-shift abnormality has occurred from the motor output T2 at the present point of time.

Then, similarly to the first aspect, in step S307, the first correction amount for correcting the basic injection amount Qb of the abnormal cylinder is calculated based on the motor output difference ΔT with the object of eliminating the rich shift of the abnormal cylinder. Then, in step S308, the second correction amount for correcting the fuel injection amount Q1 after the first correction is calculated based on the motor output difference ΔT with the object of eliminating the error of the first correction caused by the effect of hydrogen.

Then, in step S309, the first and second correction amounts are learned by the ECU 20 and the routine is ended.

Figure 13:
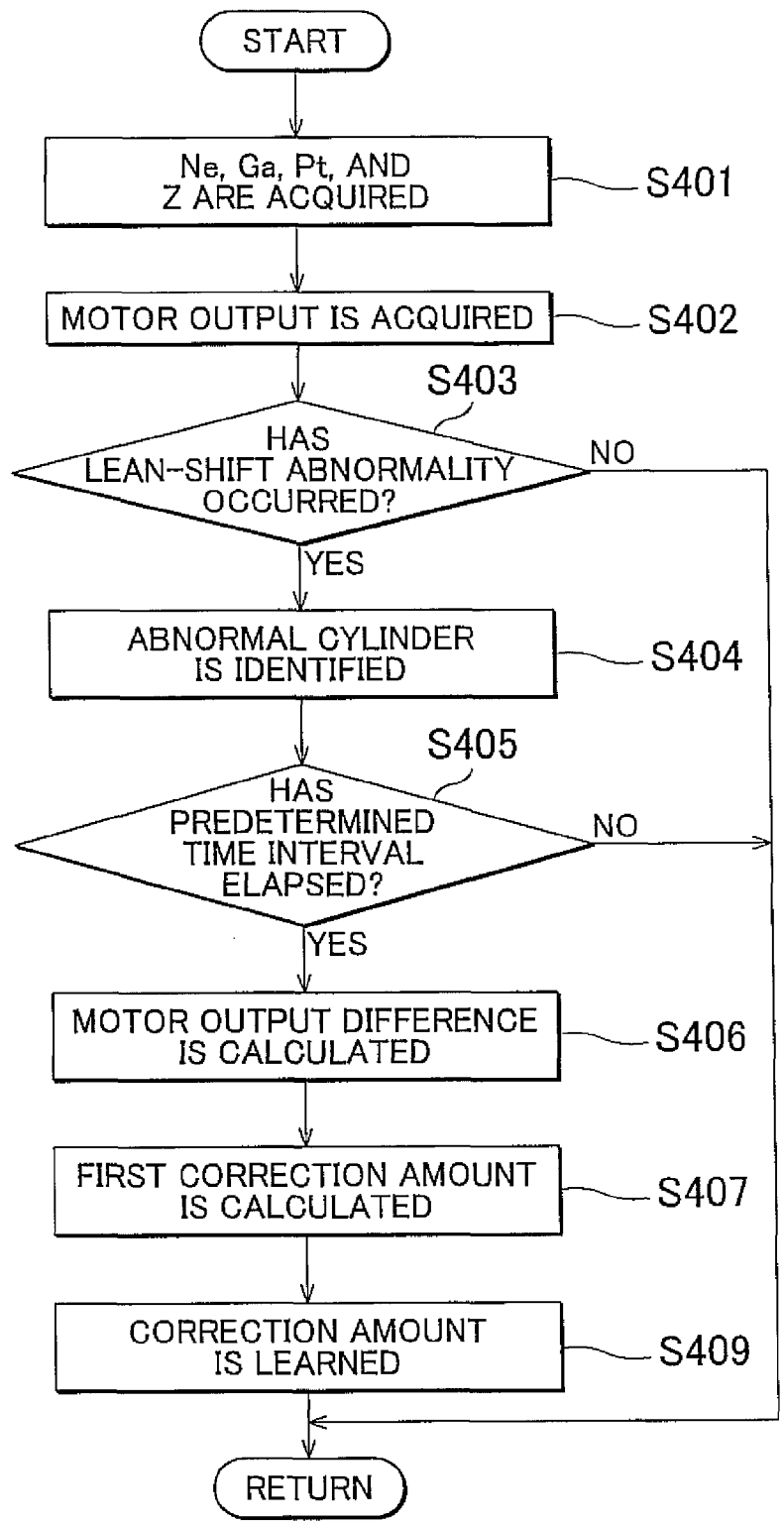
FIG. 13 is a flowchart illustrating a routine relating to fuel injection amount correction in the case where a lean-shift abnormality has occurred in the configuration according to the second aspect of the embodiment.

FIG. 13 shows a routine related to the fuel injection amount correction corresponding to FIG. 11 in the case in which the lean-shift abnormality has been detected. The routine shown in FIG. 13 is substantially similar to the routine shown in FIG. 11, the difference therebetween being only that step S202 is replaced with step S402 and step S206 is replaced with step S406. The remaining steps S401, S403 to S405, S407, and S409 are similar to steps S201, S203 to S205, S207, and S209 shown in FIG. 11.

In step S402, the motor output T of the first motor MG1 is acquired in the same manner as in the aforementioned step S302.

In step S406, similarly to step S306, the motor output difference ΔT between when the lean-shift abnormality has occurred and the present point of time (a predetermined time interval has elapsed) is calculated. Then, in step S407, the first correction amount is calculated based on the motor output difference ΔT with the object of eliminating the lean shift of the abnormal cylinder. Then, in step S409, the first correction amount is learned by the ECU 20 and the routine is ended.

Thus, in the embodiment, either of the battery state-of-charge amount ΔSOC, which is a parameter relating to the drive system of the first motor MG1, and the motor output difference ΔT, is used as a parameter relating to the imbalance degree. These parameters become the values that accurately reflect the imbalance ratio, regardless of the engine operation conditions (revolution speed, intake air amount, and the like). Therefore, by correcting the fuel injection amount based on these parameters, it is possible to perform accurate correction by an amount that is necessary and sufficient for eliminating the rich shift or lean shift, the correction accuracy is increased, and the degradation of emission during imbalance abnormality occurrence may be effectively prevented.

The embodiment of the invention is described in detail hereinabove, but variety of embodiments of the invention may be considered.

Figure 14:
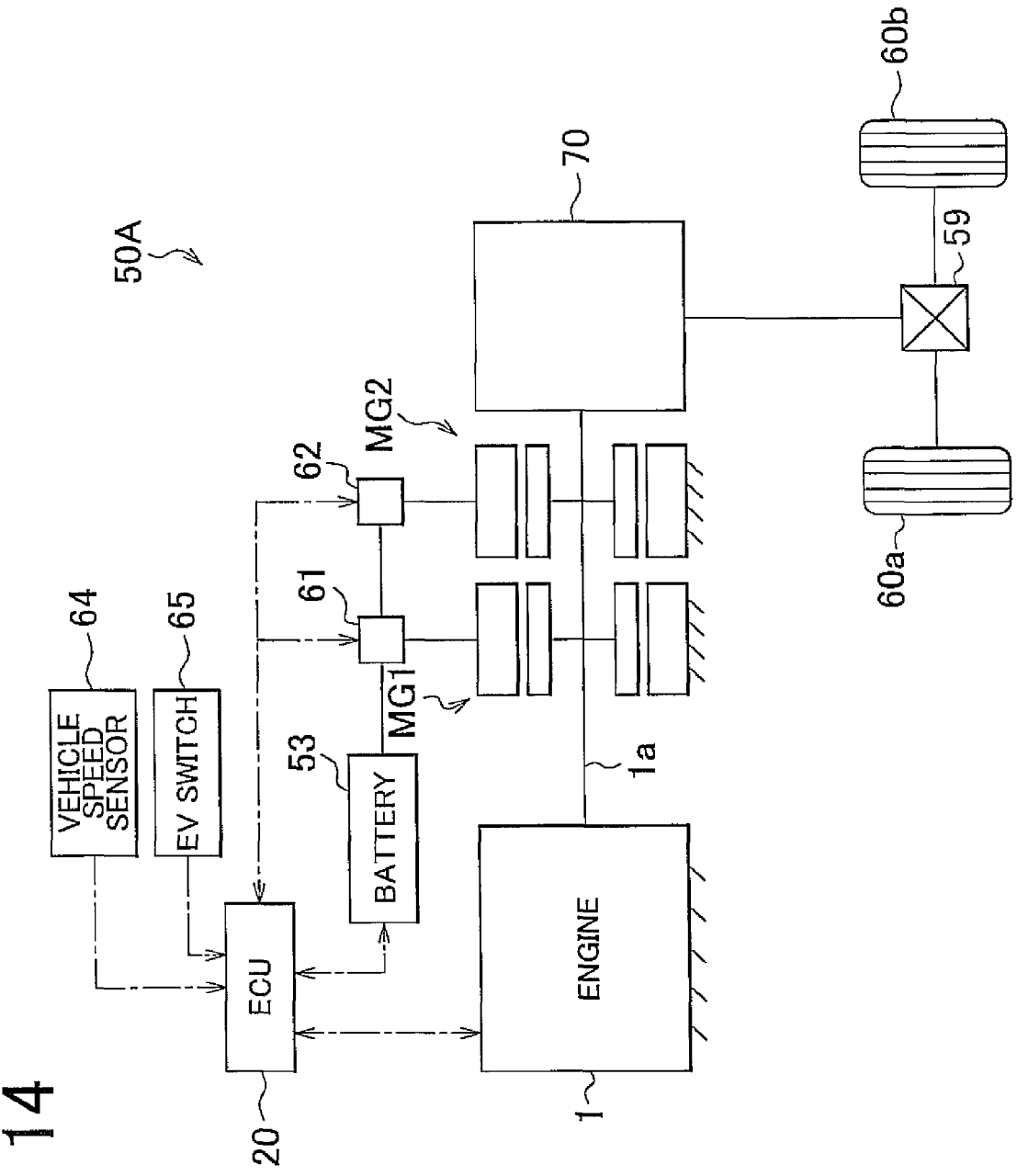
FIG. 14 is a schematic diagram of another hybrid vehicle according to the embodiment.

For example, the invention may be also applied to a hybrid vehicle 50A such as shown in FIG. 14. In the hybrid vehicle 50A, the first motor MG1 and the second motor MG2 are directly connected to the crankshaft 1a of the engine 1, that is, the first motor MG1 and the second motor MG2 are directly connected to the engine 1. Further, the crankshaft 1a is connected to the input unit of a transmission (manual or automatic) 70, and the output unit of the transmission 70 is connected by a differential gear 59 to drive wheels 60a, 60b. Other features of the configuration are similar to those of the vehicle shown in FIG. 1, like structural elements are assigned with like reference numerals, and explanation thereof is herein omitted.

The invention is not limited to the above-described embodiments, and various variation examples, application examples, and equivalents that do not depart from the concept of the invention defined by the claims are also included in the invention. Therefore, the invention should not be construed as being limited to these embodiments and may be applied to any other techniques belonging to the scope of the invention.

What is claimed is:

1. A hybrid vehicle comprising:
   a multi-cylinder internal combustion engine as a first power source for running the vehicle;
   an electric motor as a second power source for running the vehicle;
   a power source control unit that controls the internal combustion engine and the electric motor so as to obtain predetermined target outputs from both the internal combustion engine and the electric motor;
   an air-fuel ratio control unit that feedback controls an air-fuel ratio of exhaust gas of the internal combustion engine so as to obtain a target air-fuel ratio;
   a battery that stores electric power that is supplied to the electric motor;
   a state-of-charge detection unit that detects a state-of-charge of the battery;
   a detection unit that detects an air-fuel ratio imbalance abnormality of the internal combustion engine and identifies an abnormal cylinder that has caused the air-fuel ratio imbalance abnormality; and
   a correction unit that corrects a fuel injection amount of the abnormal cylinder based on a battery state-of-charge decrease amount from when the air-fuel ratio imbalance abnormality has been detected to when a predetermined time interval has elapsed after detection of the air-fuel ratio imbalance abnormality.

2. The hybrid vehicle according to claim 1, wherein the correction unit calculates a correction amount, the amount by which the fuel injection amount of the abnormal cylinder is corrected, based on a predetermined relationship between the battery state-of-charge decrease amount and the correction amount, and corrects the fuel injection amount of the abnormal cylinder by the calculated correction amount.

3. The hybrid vehicle according to claim 1, wherein:
   the detection unit detects as the air-fuel ratio imbalance abnormality an rich-shift abnormality in which a fuel injection amount in one cylinder becomes larger than those in other cylinders, and identifies the one cylinder as the abnormal cylinder, and
   the correction unit corrects the fuel injection amount of the abnormal cylinder based on the battery state-of-charge decrease amount so as to eliminate the rich-shift abnormality.

4. The hybrid vehicle according to claim 3, further comprising a separate correction unit that further corrects the fuel injection amount of the abnormal cylinder after correction by the correction unit based on the battery state-of-charge decrease amount so as to eliminate a hydrogen effect associated with the rich-shift abnormality.

5. The hybrid vehicle according to claim 1, wherein:
   the detection unit detects as the air-fuel ratio imbalance abnormality a lean-shift abnormality in which a fuel injection amount in one cylinder becomes less than those in other cylinders, and identifies the one cylinder as the abnormal cylinder, and
   the correction unit corrects the fuel injection amount of the abnormal cylinder based on the battery state-of-charge decrease amount so as to eliminate the lean-shift abnormality.

6. The hybrid vehicle according to claim 1, wherein the correction unit corrects the fuel injection amount of the abnormal cylinder during feedback control of the internal combustion engine performed by the air-fuel ratio control unit and also during normal run in which a running state of the vehicle is substantially unchanged.

7. A hybrid vehicle comprising:
a multi-cylinder internal combustion engine as a first power source for running the vehicle;
an electric motor as a second power source for running the vehicle;
a power source control unit that controls the internal combustion engine and the electric motor so as to obtain predetermined target outputs from both the internal combustion engine and the electric motor;
an air-fuel ratio control unit that feedback controls an air-fuel ratio of exhaust gas of the internal combustion engine so as to obtain a target air-fuel ratio;
a battery that stores electric power that is supplied to the electric motor;
a state-of-charge detection unit that detects a state-of-charge of the battery;
a detection unit that detects an air-fuel ratio imbalance abnormality of the internal combustion engine and identifies an abnormal cylinder that has caused the air-fuel ratio imbalance abnormality; and
a correction unit that corrects a fuel injection amount of the abnormal cylinder based on a difference in output of the electric motor between when the air-fuel ratio imbalance abnormality has been detected and when a predetermined time interval has elapsed after detection of the air-fuel ratio imbalance abnormality.

* * * * *